April 7, 1931. O. BOURBEAU 1,800,129
SAFETY DEVICE FOR AUTOMATIC ADJUSTING DEVICES FOR BRAKE MECHANISM
Filed May 28, 1930  2 Sheets-Sheet 1
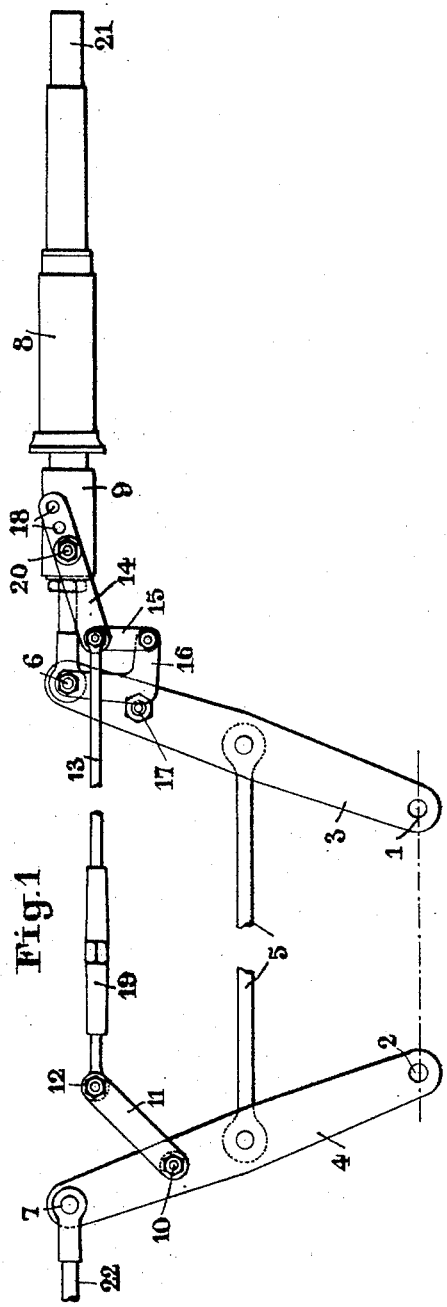
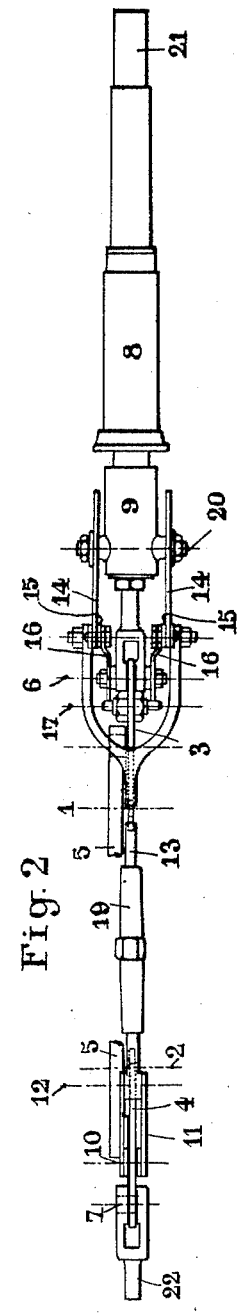
Inventor:-
Olivier Bourbeau April 7, 1931.   O. BOURBEAU   1,800,129
SAFETY DEVICE FOR AUTOMATIC ADJUSTING DEVICES FOR BRAKE MECHANISM
Filed May 28, 1930   2 Sheets-Sheet 2
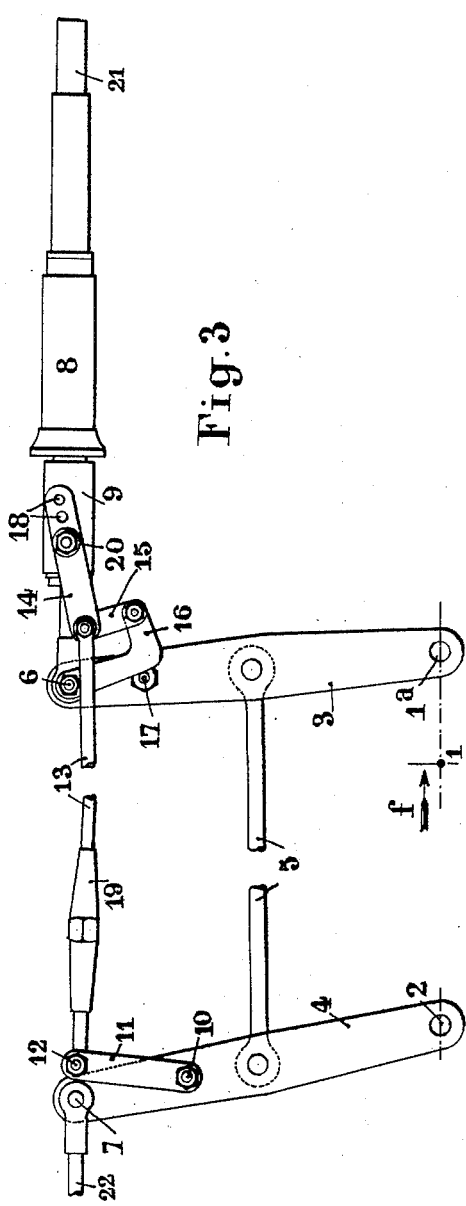
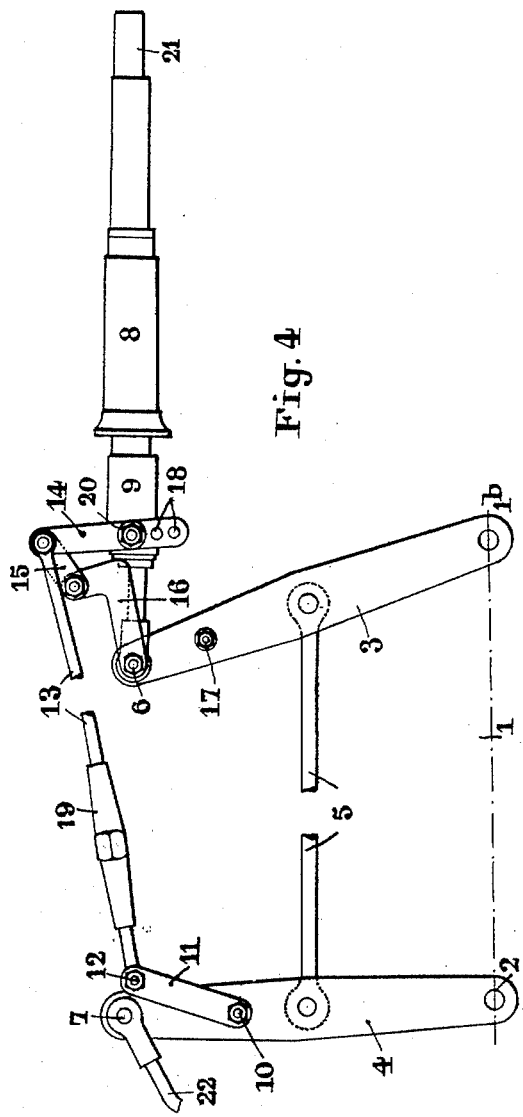
Inventor:-
Olivier Bourbeau
by Langner, Parry, Card & Langner
Attys.

Patented Apr. 7, 1931

1,800,129

UNITED STATES PATENT OFFICE

OLIVIER BOURBEAU, OF PARIS, FRANCE

SAFETY DEVICE FOR AUTOMATIC ADJUSTING DEVICES FOR BRAKE MECHANISM

Application filed May 28, 1930, Serial No. 456,645, and in France February 19, 1930.

This invention relates to a safety device applicable to devices for automatically adjusting brake rods, wherein the adjustment is effected by contact of the adjusting device with a stop provided for this purpose.

The invention has for its object more particularly to obviate untimely shortening of the rod on which the adjusting device is mounted, which shortening is produced for example by the action of a sudden application of the brake or a fracture of the member.

It is known that in apparatus of this type, for example in air brakes, the adjustment takes place when the stroke of the brake piston is greater than is normally the case when all the members have been adjusted, whereby the adjusting device is caused to contact with a suitable stop and the rod on which the adjusting device is mounted is shortened.

It may, however, occur, in the case of very sudden application of the brake, that, simply by reason of the elasticity of the members of the link mechanism, the brake piston has a stroke which is larger than the normal stroke, without it being necessary for the adjusting device to come into operation.

In the absence of any safety device, however, there will be produced under these conditions an untimely adjustment and the rod on which the adjusting device acts becomes too short.

The same condition of affairs also arises in the case of fracture of one of the members as the link mechanism will no longer have a bearing point for some of the shoes so that the piston will move along the whole of its stroke.

The present invention is adapted to remedy these defects particularly in the link mechanisms similar to those of air brakes of railway vehicles. These link mechanisms include two poles connected together by a rod of fixed length and each controlling by its upper end a link mechanism. The lower end of one of the poles is hinged at a fixed point of the brake cylinder and that of the second pole is hinged to the rod of the brake piston.

According to the present invention the safety device utilizes the variation of the angle during the tightening period of the second pole and of the axis of the adjusting device mounted on the rod of the link mechanism hinged to the said pole for the purpose of limiting the stroke of the operation of the stop of the adjusting device in such a manner that this stop only comes into action when the stroke of the brake piston reaches a predetermined value and to render it completely inoperative in the case of an excessive stroke by reason of the fracture of a member.

For this purpose the end of the pole and the stop are connected by a mechanism formed by three members hinged in pairs of which the relative angles are reduced at the same time as the angle of the pole and the rod of the adjusting device in such a manner as to enable the stop only to act when these angles have been sufficiently reduced. A rod connecting this device to the second pole determines this operation.

In order to clearly define the nature of the invention it will be described hereinafter, but solely by way of example, with reference to a preferred form of construction illustrated in the accompanying drawings, wherein:

Figure 1 is an elevation of the movable stop device and a portion of the brake mechanism in the normal position.

Figure 2 is a corresponding plan.

Figures 3 and 4 are views similar to Figure 1, the mechanism being in the braking position and in the position which it will occupy in the case of fracture of one of the rods, respectively.

Referring to the various figures, it will be seen that 1 indicates the hinge point at which the rod (not illustrated) of the brake piston is attached, and 2 the fixed hinge point to the framework. The two poles 3 and 4, connected together at the middle by a rod 5 of fixed length, engage with the two link mechanisms by the hinges 6 and 7 respectively. The automatic adjusting device 8 is mounted on the rod 21 of the link mechanism which is hinged at 6 and it is on the end of this adjusting device that the movable stop 9 slides.

At the point 10 of the pole 4 is hinged a rod 11 pivotally connected at 12 to the operating rod 13 for the movable stop, which rod is not directly hinged to the stop 9 but to a rod 14 itself hinged at 20 to the stop 9 and also to a rod 15 hinged in turn to a right angle member 16 mounted on the hinge 6. In the normal position the member 16 bears against a stop 17 secured to the pole 3.

When applying the brakes the hinge 1 moves in the direction of the arrow $f$ and reaches the position $1a$ (Figure 3), which movement represents a stroke $c$. As the point 2 is stationary and the rod 5, of fixed length, is attached at about the middle of the two poles 3 and 4, each of the hinges 7 and 6 moves through a distance of about $\frac{c}{2}$ and as these movements take place in opposite directions to one another the distance between 6 and 7 is reduced by about $c$. The movement of the hinge 6 is transmitted to the hinge 12 by the rod 13 of fixed length in such a manner that the distance between the hinges 12 and 7 is reduced by about $c$.

If the movement $c$ corresponds exactly to the tightening of the brakes and if the whole is well adjusted the hinge 12 will just come in contact with the pole 4. At the same time the angle between the pole 3 and the rod 21 which carries the adjusting device 8 is reduced as also the angles between the members 16, 15 and 14.

If there is any wear of the brake shoes the stroke $c$ is no longer sufficient to ensure the braking and a supplementary stroke $c'$ is necessary. As, however, the hinge 12 comes in contact with the pole 4 at the end of the stroke $c$ the rod 13 during this supplementary stroke cannot continue its movement to the left and, therefore, moves to the right relatively to the hinge 6 moving therewith the stop 9 against the adjusting device 8 whereby play is immediately taken up.

This taking up of the play would also take place, in the absence of the rod 13, by reason of the reduction of the angle between the pole 3 and the rod 21 of the adjusting device which produces the reduction of the angle of the square member 16 with the rod 15 and between this latter and the rod 14.

If as a result of an accident a member of the brake mechanism is fractured, for example in the case of sudden application of the brakes, the adjusting device must not be influenced by this accident. In this case as one of the rods, that which has been fractured, no longer forms a bearing point for the application of the brakes the hinge 1 moves along the whole stroke of the brake piston.

In Figure 4 it is assumed for example that the rod 22 attached at 7 has been fractured in such a manner that the hinge 1 moves to $1b$. The hinge 6 then moves towards the hinge 12 which comes into contact with the pole 4. At the same time the angle included between the pole 3 and the rod 21, carrying the adjusting device, is reduced, the square member 16 raises the rod 15 and the rod 14 and then causes them to move above the axis of the adjusting device in such a manner that the rod 13 is inoperative on the stop 9. As at the end of the stroke of the brake piston the whole mechanism 16, 15, 14 passes above the axis of the adjusting device and is completely reversed and as it is no longer urged towards its starting point, during each fresh stroke of the brake piston, it remains above the axis of the adjusting device and consequently remains inoperative.

It may be mentioned particularly that the rod 13 in any case acts as a safety device and that the variation of the angle between the pole 3 and the rod 21, carrying the adjusting device, is sufficient to ensure the correct operation of the system.

For facilitating the mounting and the adjustment of the various parts a plurality of adjusting holes 18 are provided in the rod 14 and the rod 13 is provided with an adjusting device 19 formed by a sleeve which is screwed on the adjacent portions of the rod 13 provided for this purpose with oppositely directed screw threads.

It will be understood that without departing from the scope of the invention various modifications may be made in the various parts and it will also be understood that the safety device described is applicable not only to various types of vehicle brakes but also to other mechanisms requiring similar adjustment, for example servo motors.

I claim:—

1. A safety device for automatic adjusting devices for brake mechanism, the combination with brake mechanism of an adjusting device mounted on one of the rods of said brake mechanism, a stop for co-operating with said adjusting device, and means for preventing the operation of said stop except in cases where adjustment is required, said means including a pair of poles, one of said poles being hinged to a fixed point whilst the other pole is hinged in such a manner that its hinge point is capable of moving, the pole having the movable hinge point being adapted to actuate said stop and being connected to a rod on which the adjusting device is mounted, the arrangement being such that the variations in the angle included between the said rod and the pole having a movable hinge point serve to control the adjusting device.

2. A safety device according to claim 1, including a hinged system between the pole having a movable hinge and the said stop.

3. A safety device according to claim 1, including a hinged system between the pole having a movable hinge and the said stop, said hinged system comprising a square member hinged to the pole having a movable hinge, a first rod hinged to said stop, a second rod hinged at one end to the said square member and at the other end to the first rod, the arrangement being such that the angles between the separate elements are reduced at the same time that the angle included between the pole having the movable hinge point and a rod carrying the adjusting device is reduced sufficiently to effect movement of the said stop.

4. A safety device according to claim 1, including a hinged system between the pole having a movable hinge and the said stop, said hinged system including a right-angled member and a pair of rods, one of said rods being hinged to said stop whilst the other rod is hinged at one end to said rod and at the other end to said right-angled member, a rod hinged to the pole hinged to the fixed point, a rod of constant length hinged at one end to the last mentioned rod and at the other end to the point of hinging of the first pair of rods, the rod of constant length being adapted to control and ensure the operation of the mechanism to which it is connected.

5. A safety device according to claim 1, including a hinged system between the pole having a movable hinge and the said stop, said hinged system comprising a right-angled member and a pair of rods hinged together, one of said rods being hinged to the said stop whilst the other rod is hinged to said right-angled member, a rod of constant length hinged to the point of hinging of said pair of rods and a third rod hinged to the other end of the rod of constant length and to said pole hinged to a fixed point, the arrangement being such that in the case of fracture of any part of the brake mechanism the right-angled member and the pair of rods are moved above the axis of the adjusting device.

6. In combination with brake mechanism of a pair of poles, one of which is hinged to a fixed point and the other to a movable point, a link connecting together said poles at points intermediate their ends, a rod hinged at one end to the pole having a fixed hinge point, a rod of constant length hinged at one end to the first mentioned rod, a pair of links hinged to the other end of said rod of constant length, a right-angled member pivoted at one end to the pole having a movable hinge point, the other end of said right-angled member being connected to one of the pair of links, the other of the pair of links being connected to a stop, one of the rods of the brake mechanism being pivotally connected to the said pole having a movable hinge point, an adjusting device on said last mentioned rod, said device co-operating with said stop.

7. In combination with brake mechanism of a pair of poles, one of which is hinged to a fixed point and the other to a movable point, a link connecting together said poles at points intermediate their ends, a rod hinged at one end to the pole having a fixed hinge point, a rod of constant length hinged at one end to the first mentioned rod, a pair of links hinged to the other end of said rod of constant length, a right-angled member pivoted at one end to the pole having a movable hinge point, the other end of said right-angled member being connected to one of the pairs of links, the other of the pair of links being connected to a stop, one of the rods of the brake mechanism being pivotally connected to the said pole having a movable hinge point, an adjusting device on said last mentioned rod, said device co-operating with said stop, a stop on the pole having a movable hinge point for limiting the movement of the right-angled member in one direction, and means for adjusting the relative engagement of one of the pair of links to the first mentioned stop.

8. In combination with brake mechanism of a pair of poles, one of which is hinged to a fixed point and the other to a movable point, a link connecting together said poles at points intermediate their ends, a rod hinged at one end to the pole having a fixed hinge point, a rod of constant length hinged at one end to the first mentioned rod, a pair of links hinged to the other end of said rod of constant length, a right-angled member pivoted at one end to the pole having a movable hinge point, the other end of said right-angled member being connected to one of the pairs of links, the other of the pair of links being connected to a stop, one of the rods of the brake mechanism being pivotally connected to the said pole having a movable hinge point, an adjusting device on said last mentioned rod, said device co-operating with said stop, and means for adjusting the length of the rod of constant length.

OLIVIER BOURBEAU.